(12) United States Patent
Allen (10) Patent No.: US 9,275,249 B1
(45) Date of Patent: Mar. 1, 2016

(54) ACCELERATED ENCRYPTED DATABASE OPERATIONS

(71) Applicant: Amazon Technologies, Inc., Reno, NV (US)

(72) Inventor: Nicholas Alexander Allen, Seattle, WA (US)

( * ) Notice: Subject to any disclaimer, the term of this patent is extended or adjusted under 35 U.S.C. 154(b) by 178 days.

(21) Appl. No.: 13/788,749

(22) Filed: Mar. 7, 2013

(51) Int. Cl.
  *H04L 29/06* (2006.01)
  *G06F 21/62* (2013.01)

(52) U.S. Cl.
  CPC .................................. *G06F 21/6218* (2013.01)

(58) Field of Classification Search
  USPC .......................................................... 713/165
  See application file for complete search history.

(56) References Cited

U.S. PATENT DOCUMENTS

| | | | |
|---|---|---|---|
| 7,844,829 B2 * | 11/2010 | Meenakshisundaram .... | 713/189 |
| 7,904,732 B2 | 3/2011 | Cui et al. | |
| 8,312,296 B2 | 11/2012 | Nelson et al. | |
| 8,335,920 B2 | 12/2012 | Jevans | |
| 8,352,728 B2 | 1/2013 | Suganthi et al. | |
| 8,359,476 B2 | 1/2013 | Zizzi | |
| 8,386,768 B2 | 2/2013 | Nair et al. | |
| 2005/0044366 A1 * | 2/2005 | Pucheral et al. .............. | 713/172 |
| 2008/0141023 A1 * | 6/2008 | Qi ................................. | 713/155 |
| 2012/0311347 A1 | 12/2012 | Kong et al. | |
| 2012/0321088 A1 | 12/2012 | Braun et al. | |

* cited by examiner

*Primary Examiner* — Teshome Hailu
(74) *Attorney, Agent, or Firm* — Robert C. Kowert; Meyertons, Hood, Kivlin, Kowert & Goetzel, P.C.

(57) ABSTRACT

Accelerated encrypted database operations may include a database receiving a modified database query and one or more decryption keys that correspond to the modified database query. Based, at least in part, on the modified database query and the one or more decryption keys, the database may generate partially decrypted query results. The database may submit the partially decrypted query results to an encryption manager for further decryption by an offload processor to generate further decrypted query results.

18 Claims, 4 Drawing Sheets

ACCELERATED ENCRYPTED DATABASE OPERATIONS

BACKGROUND

Databases centralize large amounts of data to implement data processing operations. Centralized data, however, carries the risk that a security vulnerability or exploit may compromise large amounts of data unrelated to the exploited operation. Encrypting database fields can reduce the scope of vulnerabilities by restricting access to information at rest. However, straightforward database encryption gains security at the expense of efficient data processing.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present disclosure as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of accelerated encrypted database operations are disclosed. Various ones of the present embodiments may include a database receiving a modified database query (or other database access request) and one or more decryption keys that correspond to the modified database query. Based, at least in part, on the modified database query and the one or more decryption keys, the database may generate partially decrypted query results. The database may submit the partially decrypted query results to an encryption manager for further decryption by an offload processor to generate further decrypted query results. In some embodiments, the encryption manager may receive an original query for the database and generate the modified database query that indicates one or more storage representations of the database from which to retrieve data. The encryption manager may retrieve the decryption keys and provide those keys and the modified database query to the database.

The specification first describes a system configured to implement accelerated encrypted database operations. Then, the specification describes a diagram of example flow among various components of such a system, followed by a flowchart of various embodiments of a method for accelerated encrypted database operations. The specification then describes an example system that may implement the disclosed accelerated encrypted database operations. Various examples are provided throughout the specification.

Figure 1:
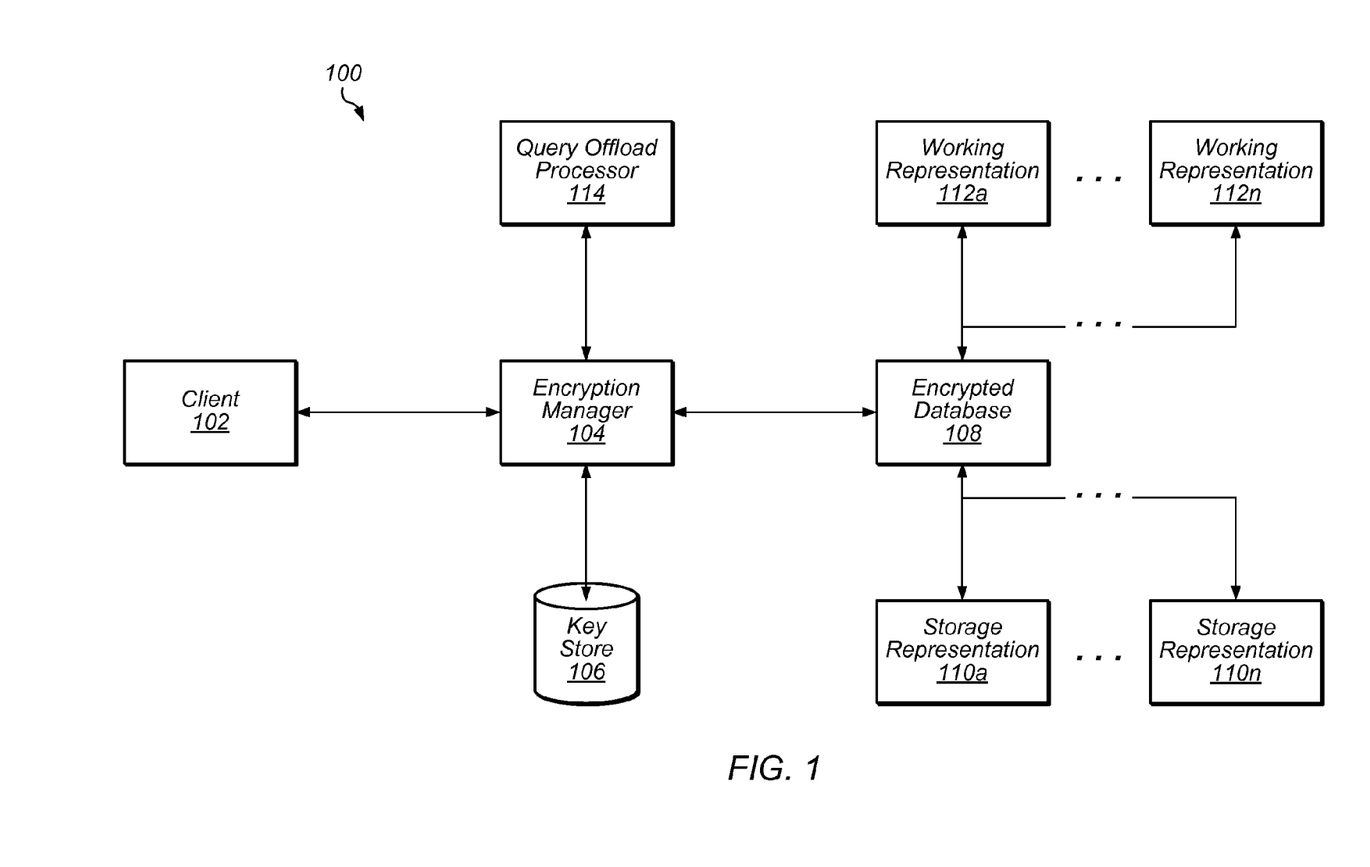
FIG. 1 illustrates a block diagram of a system for accelerated encrypted database operations, according to some embodiments.

Turning now to FIG. 1, an example system 100 that may provide for accelerated encrypted database operations is shown. For example, system 100 may provide a mechanism in which to trade off security for performance in some embodiments. In the illustrated embodiment, system 100 includes encryption manager 104, key store 106, encrypted database 108, one or more storage representations 110a to 110n, one or more working representations 112a to 112n, and query offload processor 114. Also shown in FIG. 1 is client 102, which is representative of clients that may interact with system 100 (e.g., by submitting a query). In various embodiments, the various components of system 100, such as encryption manager 104, key store 106, encrypted database 108, storage representation(s) 110*a* to 110*n*, working representation(s) 112*a* to 112*n*, and query offload processor 114 may be implemented as a distributed computing system, on one or more computing devices (whether collocated or remote). Accordingly, system 100 may provide for accelerated database operations on encrypted data.

In one embodiment, client 102 may be a computer system, such as a website, program, server, or other computer system, which may be configured to submit a query (or other database access request) of a database. A database may include a data store, a data warehouse, a column oriented data store, among other examples. Client 102 may be configured to submit a query to encrypted database 108 via encryption manager 104, which may act as a database proxy. Client 102 may also be configured to submit authentication information to the system (e.g., encryption manager 104) to authenticate itself. In one embodiment, such authentication information may be an authentication token, (e.g., a client session token, a non-session type token, etc.), as described herein. The client authentication token may identify the client and may also impose other constraints on the query, such as key restrictions, time-based restrictions, database-based restrictions, etc.

In one embodiment, after authenticating the client, encryption manager 104 may be configured to make decisions about where work for the query is going to be performed. For example, as described herein, some work may be performed by query offload processor 114, and some may be performed by encrypted database 108. Encryption manager 104 may be configured to analyze the query, which may be a relational query, NOSQL query, or other type of query. Analyzing the query may include analyzing the query operations and anticipating what the database would do in response to the query. For example, encryption manager 104 may anticipate if the database would need access to particular fields, tables, etc. Based on the encryption manager's analysis, encryption manager 104 may be configured to retrieve one or more decryption keys from key store 106 and provide the decryption keys to encrypted database 108. In one embodiment, encryption manager 104 may modify the client authentication token resulting in a variadic token that includes the retrieved decryption keys. Encryption manager 104 may be configured to provide the variadic token to encrypted database 108. The term variadic token indicates that the token may include any number of decryption keys. For example, for one query, only a single decryption key may be included as part of the token whereas in another example, the token may include three (or some other number of) decryption keys.

Key store 106 may be a storage mechanism that stores decryption keys. Key store 106 may be accessible by encryption manager 104 to provide the appropriate key(s) to encrypted database 108. Keys may also be accessible by query offload processor 114, directly or indirectly via encryption manager 104. In various embodiments, key store 106 may be a hardware storage module, a secure software storage system, or other storage mechanism to store keys.

Encrypted database 108 may be a database with encrypted data. Encrypted database 108 may be a database (e.g., SQL server, etc.) that is capable of performing relational or other queries. Encrypted database 108 may be configured to receive a query plan (e.g., modified query) from encryption manager 104 and one or more decryption keys (e.g., as part of a variadic token). Encrypted database may include one or more storage representations 110*a*-110*n* and may also include one or more working representations 112*a*-*n*. As described herein, the working representations may be temporary storage locations for partially decrypted data from the storage representations.

Storage representations 110*a*-110*n* may each be a different encrypted version of the same pieces of data. Accordingly, the various storage representations may store the same data encrypted in different ways. Each of the encryption techniques may preserve a property of the data while obscuring (e.g., destroying, etc.) another. For example, one storage representation may be encrypted in a manner that is order preserving and obscures other properties. Other examples are described herein.

In various embodiments, the encrypted data of the storage representations include an additional, outer layer of encryption. Such an encryption layer corresponds to a respective one of the decryption keys. When the outer encryption layer is decrypted with one of the decryption keys, the property preserving encryption may still be in place thereby making the data partially decrypted (and partially encrypted).

As part of creating the working representations, the outer layer of encryption is decrypted with one of the decryption keys and the partially decrypted data is stored in a respective one of the working representations. As part of the working representation creation process, the variadic token may be used to create a work token that may include various constraints for the working representation. For example, the work token may constrain the time period for which the working representation may exist. Upon expiration of that time period, the working representation may self destruct thereby ceasing to exist.

Consider a simple example in which encryption manager 104 determined that decryption keys 1 and 2 are needed for the modified query to query storage representations 1 and 2. Encryption manager 104 may send the modified query and a variadic token that includes decryption keys 1 and 2 to encrypted database 108. Encrypted database 108 may then use the information from the modified query (e.g., which tables to access) along with decryption keys 1 and 2 to create working representations 1 and 2 by decrypting at least some of the data from storage representations 1 and 2 with decryption keys 1 and 2, respectively. Additionally, in one embodiment, encrypted database 108 may create a respective work token for each of working representations 1 and 2, which may impose one or more authorization constraints (e.g., time-bound, user-bound as derived from the original client authentication token and propagated by the variadic token, bound to a subset of data, etc.) on the working representations. Because working representations are partially decrypted versions of the data, such constraints from the work token may control/limit how much potential exposure a working representation may have. Query operations may then be performed on the partially decrypted data from working representations 1 and 2 to determine which portions to provide to encrypted database 108 for further decrypting by query offload processor 114. Upon expiration of the time constraint for the working representations, they may be destroyed or otherwise time restricted.

Note that the use of two keys, two storage representations, and two working representations is purely illustrative for the previous example. Further note that a plurality of storage representations may persist and each storage representation need not be used for each query. For instance, one query may utilize one of the storage representations to create a single working representation whereas in another example, the query may utilize three storage representations to create three working representations. If the database includes three total storage representations, then in the example that only uses one of them, two others may not be accessed for that given query. Note, however, that in various embodiments, the accessed storage representations may have a 1:1 correspondence with the number of working representations that are created for a given query.

In one embodiment, a materialized view is one way to represent the working representation. In such an embodiment, an in-memory table in the database may be constructed as part of the query. Accordingly, this may allow the database engine to treat something as a table even when it is not represented that way. The storage and working representations may be implemented in other ways as well (e.g., acceleration built into the database engine).

Various implementations of storage and working representations may exist. For example, many of those implementations may rely on homomorphic encryption, which are encryption operations that allow certain constrained functions to be performed without having to decrypt the data.

A first example storage/working representation implementation is based on the property equality. Equality may permit selecting by value, grouping according to if they have an equal field, joining of tables, among other operations. In one embodiment, the equality representation may permit accelerating equality-dependent query operations, such as WHERE, GROUP BY, and JOIN. The equality representation, when decrypted (e.g., by a corresponding decryption key from the variadic token), may map each field value in a consistent fashion but provide no relative indication about values. For example, in an encrypted database of cheese types, the encrypted field values may reveal no information about the value. For instance, the decrypted field values may map the value 'cheddar' to the integer 137 and the value 'gouda' to the integer 72. Using the cheese example, encryption manager 104 may receive a client query "SELECT cheese WHERE type='cheddar'". Encryption manager 104 may construct a modified query "SELECT cheeses WHERE type=137" and then send the modified query along with a decryption key for the equality representation.

A second example storage/working representation implementation is based on order. Order may permit top queries, minimum and/or maximum queries, order return values, etc. In one embodiment, the order representation may permit accelerating order-dependent query operations such as ORDER BY, MAX, MIN, or BETWEEN. The order representation, when decrypted, may map each field in a non-unique but order-preserving fashion. For example, the decrypted field values may map the value 'cheddar' to the integers 2, 7, 9, and 23, and the value 'gouda' to the integers 32, 88, and 112. The encrypted database could process a query ordering cheeses by type without revealing to an observer whether cheese type 23 is the same as cheese type 9 or cheese type 32.

A third example storage/working representation implementation is based on arithmetic. Arithmetic operations may include mathematical manipulations such as SUM, AVERAGE, DATEADD, DATEDIFF, or MULT. The arithmetic representation, when decrypted, may map each field using a group homomorphism to produce values that are non-unique and non-ordered, but preserve the group operation.

In various embodiments, the mapping of a storage representation may vary to enhance the storage representation's security. For example, in one embodiment, for an equality preserving storage representation, the mapping for equality on each table of the representation may vary to make it more difficult for the values to be discerned.

In some embodiments, the data in the storage representations may be scrambled on a periodic basis (e.g., hourly, daily, weekly, etc.). For example, today cheddar may be 42, tomorrow cheddar may be 71.

In one embodiment, encryption manager 104 may track the amount of data (e.g., number of bits) that is potentially compromised. In one embodiment, the amount of data that is potentially compromised for a given decryption key may be the amount of data that has been partially decrypted by that decryption key. Once the tracked amount corresponding to that decryption key meets a threshold, then rekeying may be performed such that that decryption key and/or all the decryption keys are replaced, and the manner in which the property preserving transformation is replaced such that no correlation exists between the previous key-data mapping and the rekeyed key-data mapping.

The various storage representations may be implemented in a number of ways. For example, in one embodiment, homomorphic encryption of the representations may be used allowing certain operations to be performed with the chosen function. In another embodiment, one or more preselected operations (e.g., equality, order, etc.) may be chosen and a respective encrypted storage representation can be statically created ahead of time before the query. Each of those representations may be a representation that preserves a property (e.g., equality), obscures another property, and scrambles the actual values. As described herein, for each of those representations, a second encryption, which may correspond to one of the decryption keys, may be performed on top of the property preserving encryption such that the storage representations have first and second levels of encryption. As a simple example, storage representation may include a first level of encryption that preserves the property equality. It may also include a second, full level of encryption that corresponds to decryption key 1 (e.g., decryption key 1 may be used to decrypt that second level of encryption) on top of the first level of encryption. When the decryption key is applied thereby partially decrypting the data in a property preserving manner, the partially decrypted data may be temporarily stored in one of the working representations, as described herein.

The partially decrypted results, which may be temporarily stored in the working representation(s), may then be queried according to the modified query resulting in a portion of the partially decrypted results. That portion of the partially decrypted results may then be provided back to encryption manager 104. Encryption manager 104 may then provide that portion to query offload processor 114 to fully decrypt the results and obtain the exact values of the query. Those exact values may be provided to client 102 via encryption manager 104. In one embodiment, query offload processor 114 may have access to all of the decryption keys that are used for the various first levels of encryption (e.g., the keys that correspond to the equality preserving encryption, order preserving encryption, etc.). In one embodiment, the offload processor may not access the actual database itself; instead, it may access the partially decrypted query results from the encryption manager, which in turn, were received from a working representation of the database.

In one embodiment, execution of the modified query, as generated by the encryption manager, may result in more records being retrieved than would be retrieved according to the original search query. Processing of the partially decrypted data by the offload processor may, however, result in removing the extraneous records into a final correct subset of records that are fully decrypted.

In various implementations, encryption manager 104 may determine a time/speed tradeoff for a particular application of the system. For example, where security is more valuable and the query need not be fast, the fully encrypted data may be pulled off the database for processing by the query offload processor. Or, if the query needs to be faster, then certain fields may be partially decrypted at the database, according to the accelerated encrypted database operations described herein. Such distribution of the query between the encrypted database and the offload processor may factor into the determination of the modified query (also referred to as query plan). The distribution may be determined on a case by case basis depending on various performance and/or security requirements of the query. As one example, consider a scenario in which a particular field will only be searched a single time. In such a scenario, it may make sense for the offload processor to fully execute the query without risking compromise of the data by having the encrypted database partially decrypt the data before sending that partially decrypted data to the offload processor. As another example, consider a scenario in which a particular field needs to be access numerous times. In that case, the encryption manager may determine that the performance gain by having the encryption manager partially decrypt the data outweighs the security risks. As a result, in such an example, the encrypted database may partially decrypt the data and then provide it to the offload processor, via the encryption manager, for further processing/decryption. The determination of the modified query may include computing an objective function that weighs the various factors (e.g., performance, security, etc.).

In one embodiment, the decision on whether to accelerate the query of a given field may be based on a client hint submitted as part of the original query. For example, the client may indicate the query annotations that should be accelerated and/or those that should be afforded more security. Where the query should be accelerated, that portion(s) of the query may be performed on the database whereas the portion(s) that should be afforded more security may be performed on the offload processor.

In various embodiments, encryption manager 104 may be a small, compact, hardened computer system that is less likely to be compromised than encrypted database 108. Encryption manager 104 may be owned by the client or by the service provider who owns the other components of system 100. In one embodiment, encryption manager 104 may be client specific. In such an embodiment, the client may set up the encryption manager locally on a virtual machine or other space such that it is a private copy. In another embodiment, the encryption manager may be a locked down computing system of system 100.

Figure 2:
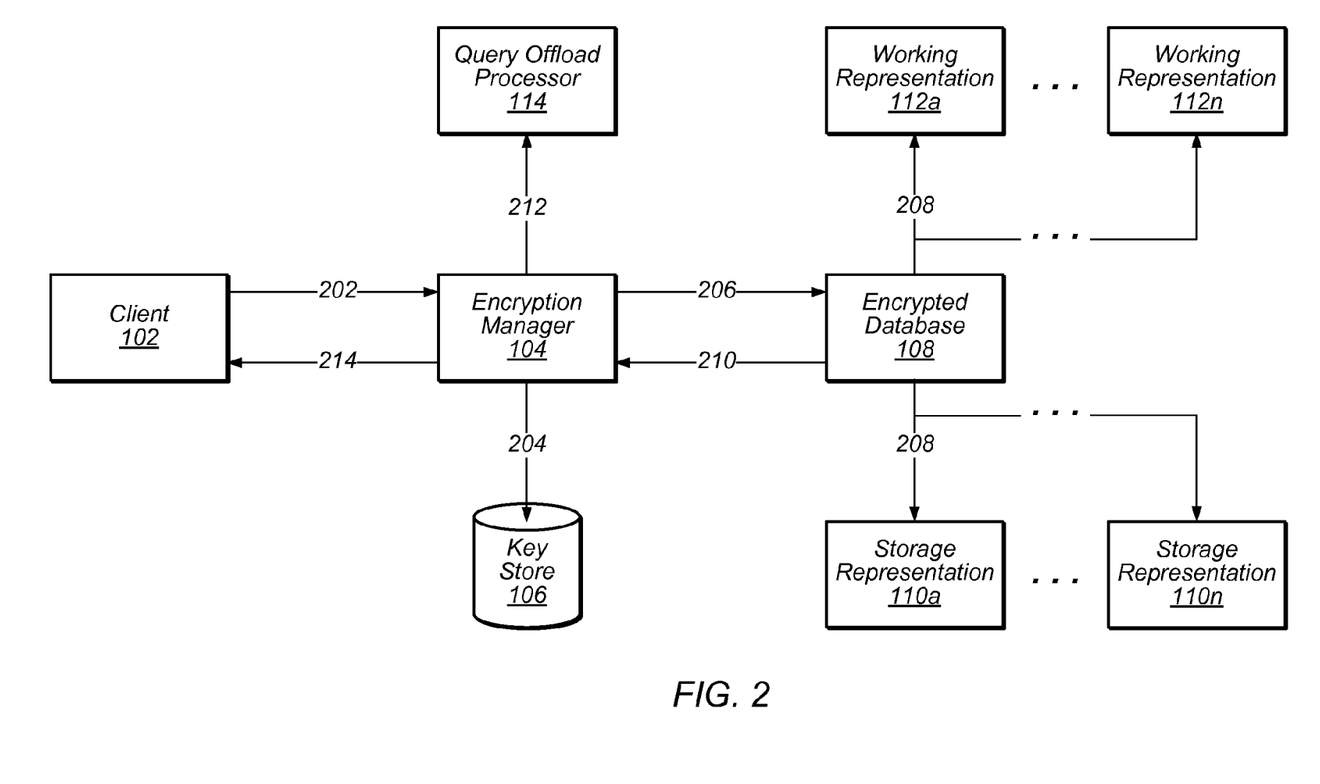
FIG. 2 illustrates example flow among the various components of a system for accelerated encrypted database operations.

An example implementation of accelerated encrypted database operations is shown in FIG. 2. As shown at 202, a client (e.g., client 102) may construct a database query for an encrypted database (e.g., encrypted database 108). The client may send the query to an encryption manager (e.g., encryption manager 104) along with a client authentication token that authenticates the client.

As shown at 204, the encryption manager may analyze the query to determine an anticipated query plan, also referred to as a modified query. The anticipated query plan may project a pattern of field accesses that the encrypted database would use to process the query. The encryption manager may then retrieve one or more decryption keys from a key store based on the anticipated query plan. The encryption manager may then attach the retrieved decryption key(s) to the client authentication token to produce a variadic authentication token.

In some embodiments, the client authentication token may include a client decryption hint indicating fields in the encrypted database that the client is willing to permit to be decrypted on the database server (e.g., fields that may not need as much security and/or fields where improved performance outweighs security concerns). The decryption key(s) from the key store that are retrieved by the encryption manager may be based on the client decryption hint.

At 206, the encryption manager may construct a modified query for the encrypted database. The encryption manager may determine a portion of the anticipated query plan to execute on the database server. Accordingly, the modified query may be constructed by altering the original client query to perform decryption operations as part of the query with reference to decryption key parameters that are supplied by the authentication token. The encryption manager may then send the modified query and variadic authentication token to the encrypted database.

As indicated at 208, the encrypted database may process the modified query by accessing one or more encrypted storage representations, as described herein. The encrypted database may construct one or more working representations to provide temporary storage areas for decrypting the storage representations. The working representation, for example, a materialized view of the decrypted table, may be associated with a work token based on the variadic authentication token. The work token may provide decryption keys and access control for accessing the working representation.

As described herein, the work token may impose time constraint(s), user constraint(s), and/or constraint(s) on which data may be accessed.

In some embodiments, processing the modified query may include the encrypted database accessing multiple storage representations and corresponding working representations. For example, the modified query may include equality-dependent query operations for one field and order-dependent query operations for another field.

In various embodiments, a storage representation may satisfy multiple query properties. For example, the encrypted database may have a storage representation that, when decrypted, maps each field value in a consistent and order-preserving fashion without revealing the field value. The encryption manager may provide decryption keys for this order and equality preserving storage representation when a modified query includes query operations of both types for a single field. The storage representations may be ranked in an order so that, for example, the order preserving storage representation is prioritized over the order and equality preserving storage representation unless that specific combination is required by the query.

In some embodiments, the work token may include a work authorization lifetime constraining the length of time the working representation is permitted to exist. For example, the encryption manager may attach a timestamp or other lifetime indicator to the variadic authentication token to control the lifespan of decrypted representations. The encrypted database may configure the working representation to automatically destroy itself when the work authorization lifetime expires. Or, as another example, the working representation may only be accessible during time(s) defined by the work authorization lifetime. For instance, if the work authorization defines an accessible time period as 8 am to 5 pm, then after 5 pm, the working representation may no longer be accessible. The variadic authentication token may even include a number of work authorization lifetimes specifying different constraints based on the type of data being decrypted.

As shown at 210, the encrypted database may return a result set of partially decrypted data for the modified query to the encryption manager. The result set may be a complete response to the modified query or may be a stream of results for the modified query returned over time. The encryption manager may perform buffering, pagination, or other processing operations to the result set for efficient processing.

At 212, the encryption manager may provide a portion of the anticipated query plan to an offload processor for execution by the offload processor. Such a portion may be executed entirely on the offload processor or it may be a portion that is partially decrypted by the database server. The offload processor may be equipped with and/or have access to decryption keys, lookup tables, and/or other storage operable to fully decrypt the partially decrypted result set from the encrypted database. The encryption manager may use the output of the offload processor to construct a response to the client query.

Using the example of the equality-dependent query operation, the offload processor may replace decrypted integer values for cheese types in the result set with their original string values. As another example, the client query may specify a multiplication operation not supported by any of the encrypted database storage representations. The encryption manager may select, from the encrypted database, all of the rows needed to perform the query, decrypt the rows in the result set, and perform the multiplication operation using the offload processor. Although the offload processor may perform query operations slower than the database engine, it may also avoid having to decrypt certain portions of data in the encrypted database and subject that data to being compromised.

As shown at 214, the encryption manager may return the query response to the client.

Figure 3:
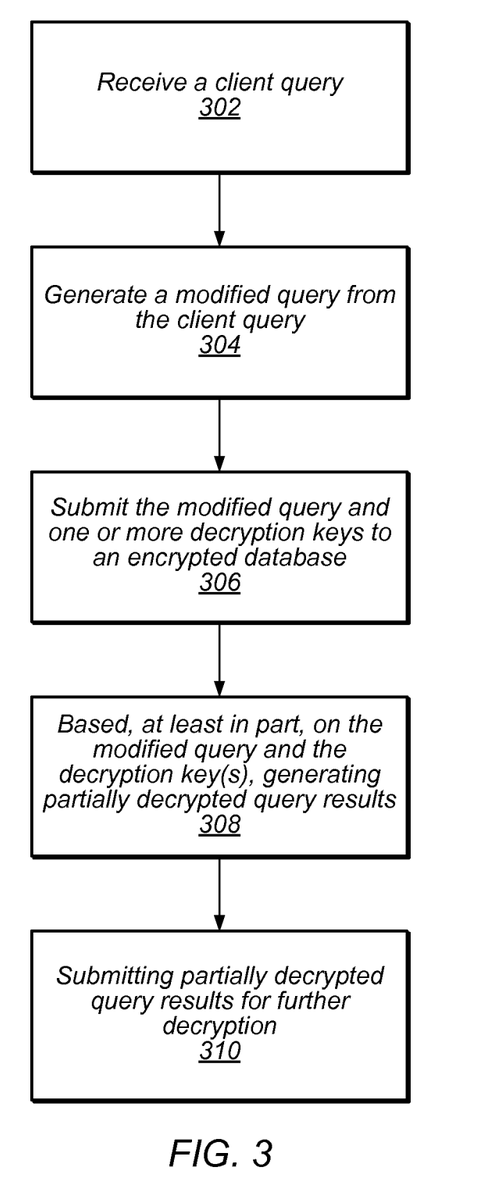
FIG. 3 illustrates a flowchart of an example method for accelerated encrypted database operations, according to some embodiments.

Turning now to FIG. 3, in various embodiments, system 100 may be configured to accelerate encrypted database operations according to a method for accelerated encrypted database operations, such as that of FIG. 3. While the method of FIG. 3 may be described as being performed by various components of system 100 (e.g. encryption manager 104, encrypted database 108, query offload processor, etc.), the method need not be performed by any specific component in some cases. For instance, in some cases, the method of FIG. 3 may be performed by some other component or computer system, according to some embodiments. Or, in some cases, components of system 100 may be combined or exist in a different manner than that shown in the example of FIG. 1. In various embodiments, the method of FIG. 3 may be performed by one or more computers of a distributed computer system, one of which is shown as the computer system of FIG. 4. The method of FIG. 3 is shown as one example implementation of a method for accelerated encrypted database operations. In other implementations, the method of FIG. 3 may include additional or fewer blocks than are shown.

As illustrated at 302, a client query may be received, for example, by an encryption manager. Using the example from above, a client query may be "SELECT cheese WHERE type='cheddar'". In one embodiment, an authentication token (e.g., client session token) may also be received.

As shown at 304, a modified query may be generated from the client query. The modified query may indicate one or more storage representations of the encrypted database from which to retrieve data. Continuing the cheddar example, encryption manager 104 may construct a modified query "SELECT cheeses WHERE type=137" that indicates that data for the query is to be retrieved from the equality storage representation.

In one embodiment, the encryption manager may determine one or more decryption keys to attach to the client authentication token to create a variadic authentication token. The determined decryption keys may correspond to the storage representation(s). Continuing the cheddar example, a decryption key corresponding to the equality storage representation may be included as part of the variadic authentication token.

As illustrated at 306, the modified query and the one or more decryption keys may be submitted to and received by the encrypted database.

At 308, partially decrypted query results may be generated based, at least in part, on the modified query and the decryption key(s). In one embodiment, the encrypted database may decrypt a respective outer encryption layer from the indicated one or more storage representations with the one or more decryption keys. For example, a particular key may correspond to a particular storage representation and may be used to decrypt the outer layer of encryption for that particular storage representation.

Data (e.g., fields) of a particular storage representation may be decrypted using a particular decryption key into a particular working representation. The working representation may include a mapping of field values in a property preserving manner without revealing the underlying values. For example, one or more of equality, order, arithmetic, or other properties may be preserved for a given storage representation and corresponding working representation while obscuring other ones of those properties. For example, a storage representation and its corresponding working representation may preserve only equality while obscuring other properties, whereas another storage representation may preserve both equality and order while obscuring other properties. Accordingly, each of the one or more storage representations may be associated with a different respective set of one or more types or query operation(s).

In various embodiments, the encrypted database may create a work token from the variadic token to authorize creation of a working representation. The work token may enforce a constraint (e.g., time limit of existence of the working representation, user constraint, data field constraint, etc.) on the corresponding working representation. Note that each work token may correspond to a respective one working representation.

In various embodiments, which storage representations that are accessed for query operations may be determined based on which ones are indicated in the modified database query.

As shown at 310, partially decrypted query results may be submitted for further decryption. In one embodiment, the partially decrypted query results may be submitted from the encrypted database to the query offload processor via the encryption manager. The query offload processor may then further process the data, for example, by fully decrypting the partially decrypted data.

In one embodiment, it may be determined that a type of query indicated in the original query is not supported by the one or more storage representations. For example, consider a scenario in which the only storage representations are an equality representation and an order representation. The query may include a multiplication operation. In such an example, the portion of the original query corresponding to the unsupported type of query (e.g., the multiplication operation) may be provided to the query offload processor for performing that query operation.

In various embodiments, once the final results are ready (e.g., fully decrypted and processed by the query offload processor), the fully decrypted results may be provided from the query offload processor to the client, via the encryption manager.

Example Computer System

Various embodiments of the system and method for accelerated encrypted database operations, as described herein, may be executed on one or more computer systems, which may interact with various other devices. Note that any component, action, or functionality described above with respect to FIGS. 1-3 may be implemented on one or more computers configured as computer system 400 of FIG. 4, according to various embodiments. In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In some cases, it is contemplated that embodiments may be implemented using a single instance of computer system 400, while in other embodiments multiple such systems, or multiple nodes making up computer system 400, may be configured to host different portions or instances of embodiments. For example, in one embodiment some elements may be implemented via one or more nodes of computer system 400 that are distinct from those nodes implementing other elements.

Figure 4:
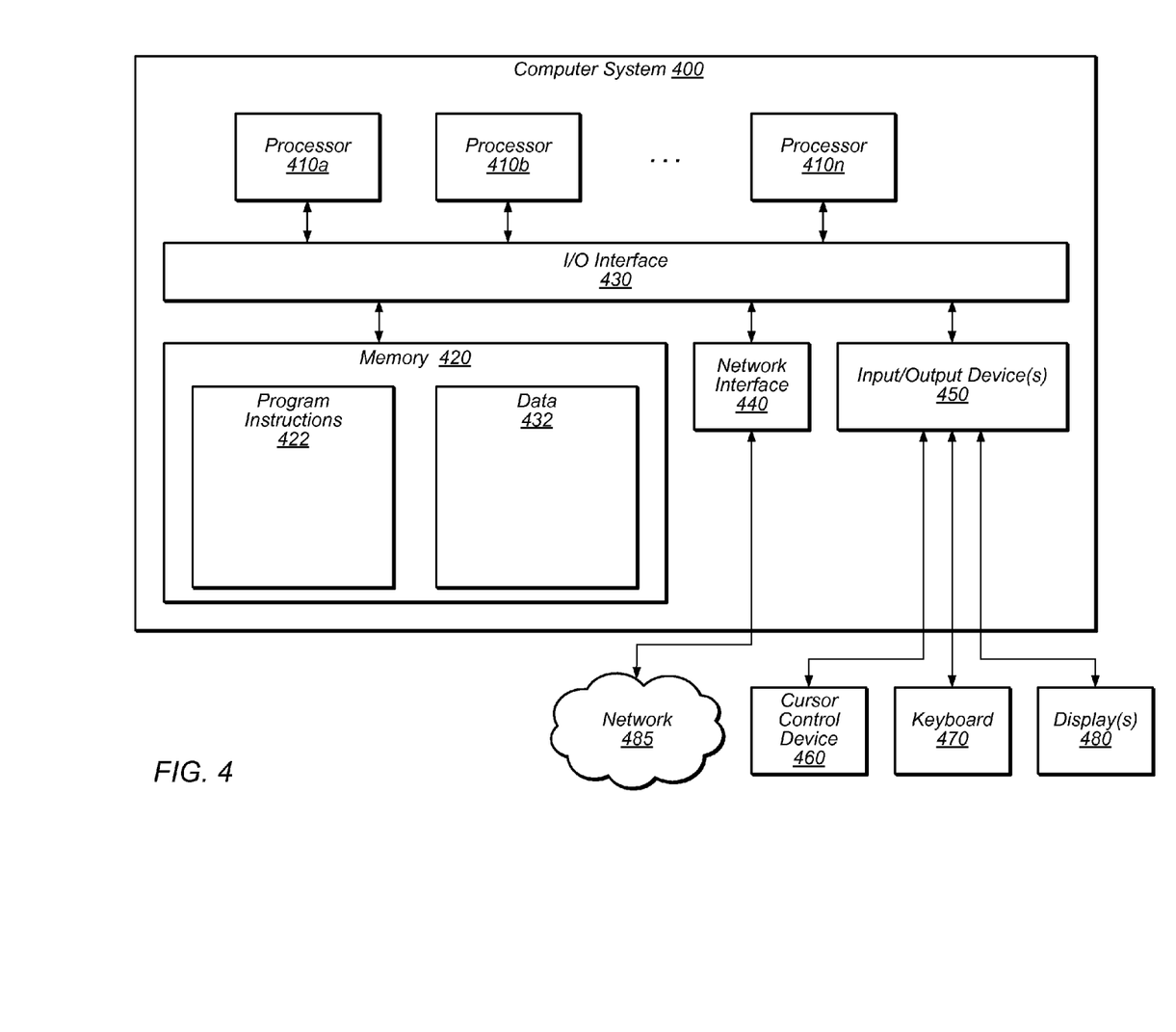
FIG. 4 illustrates one example of a computer system suitable for implementing various elements of accelerated encrypted database operations, according to some embodiments.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions 422 may be configured to implement any functionality of system 100 described above. Additionally, data 432 of memory 420 may store any of the information or data structures described above. In some embodiments, program instructions and/or data may be received, sent or stored upon different types of computer-accessible media or on similar media separate from system memory 420 or computer system 400. While computer system 400 is described as implementing the functionality of functional blocks of previous Figures, any of the functionality described herein may be implemented via such a computer system.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network 485 or between nodes of computer system 400. Network 485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

As shown in FIG. 4, memory 420 may include program instructions 422, which may be processor-executable to implement any element or action described above. In one embodiment, the program instructions may implement the methods described above, such as the methods illustrated by FIG. 3. In other embodiments, different elements and data may be included. Note that data 432 may include any data or information described above.

Those skilled in the art will appreciate that computer system 400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link.

Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
   an encryption manager configured to:
      receive a query for an encrypted database,
      generate a query plan from the received query that indicates one or more storage representations of the encrypted database from which to retrieve data, and
      submit, to the encrypted database, the query plan and a token that includes one or more decryption keys corresponding to the one or more storage representations; and
   the encrypted database that includes the one more storage representations, wherein the encrypted database is configured to:
      use the one or more decryption keys to generate partially decrypted data from the indicated one or more storage representations, wherein to use the one or more decryption keys to generate partially decrypted data, the encrypted database is further configured to decrypt a respective outer encryption layer of the indicated one or more storage representations with the one or more decryption keys into corresponding one or more working representations, wherein the one or more working representations include a respective mapping of field values in an property preserving manner without revealing underlying field values, and
      provide the partially decrypted data to the encryption manager for further decryption operations by a query offload processor.

2. The system of claim 1, wherein the encrypted database is further configured to create a work token from the token for each of the one or more working representations, wherein each work token is configured to enforce an authorization constraint on the corresponding working representation.

3. The system of claim 1, wherein each of the one or more storage representations is associated with a different respective set of one or more types of query operations.

4. A method, comprising:
   performing, by one or more computers:
      a database receiving a modified database query and one or more decryption keys that correspond to the modified database query;
      based, at least in part, on the modified database query and the one or more decryption keys, the database generating partially decrypted query results, wherein said generating partially decrypted query results is performed using one or more storage representations of the database that are selected, based, at least in part, on the modified database query and comprises:
         decrypting a respective outer encryption layer of the one or more storage representations with the received one or more decryption keys into corresponding one or more working representations, wherein the one or more working representations include a respective mapping of field values in an property preserving manner without revealing underlying field values; and
      the database submitting the partially decrypted query results to an encryption manager for further decryption by an offload processor to generate further decrypted query results.

5. The method of claim 4, wherein the database includes a plurality of storage representations of data, wherein the storage representations preserve at least one property of the data and obscure at least one other property, wherein the storage representations differ from one another by which property is preserved, and wherein the storage representations include a respective outer layer of encryption corresponding to a respective one of the one of more decryption keys.

6. The method of claim 5, wherein said generating partially decrypted query results includes, for at least one of the storage representations, decrypting the respective outer layer of encryption with the corresponding decryption key.

7. The method of claim 4, wherein the received one or more decryption keys are received as part of a variadic authentication token that is a modified version of a client authentication token from a client, further comprising:
   the database generating a respective work token corresponding to each working representation, wherein the work tokens are based, at least in part, on the variadic authentication token, and wherein the work tokens indicate one or more authorization constraints on the working representations.

8. The method of claim 4, wherein the working representations are time constrained temporary storage locations.

9. The method of claim 4, wherein each of the one or more storage representations is associated with a different respective set of one or more types of query operations.

10. The method of claim 4, further comprising:
determining that a type of query indicated in an original query, from which the modified database query is derived, is not supported by the one or more storage representations; and
providing a portion of the original query corresponding to the type of query to the offload processor that is separate from the database for processing by the offload processor.

11. The method of claim 4, further comprising providing the further decrypted query results to a client that provided an original query from which the modified database query was derived.

12. The method of claim 4, wherein the modified database query is based, at least in part, on a projected pattern of field accesses determined from an original query.

13. The method of claim 4, wherein the received one or more keys are selected based, at least in part, on the modified database query.

14. The method of claim 4, wherein the modified database query is determined based, at least in part, on security and performance factors.

15. The method of claim 4, wherein one of the one or more decryption keys is replaced based on a tracked amount of data partially decrypted by the one of the one or more decryption keys meeting a threshold value.

16. A non-transitory computer-readable storage medium storing program instructions, wherein the program instructions are computer-executable to implement:

receiving a query plan and one or more decryption keys corresponding to one or more storage representations;

partially decrypting, based at least in part on the one or more decryption keys, data from one or more storage representations that are associated with the received query plan into a respective working representation for each of the one or more storage representations, wherein partially decrypting comprises decrypting a respective outer encryption layer of the one or more storage representations with the one or more decryption keys into the respective working representation for each of the one or more storage representations, wherein the respective working representations include a respective mapping of field values in an property preserving manner without revealing underlying field values; and providing the partially decrypted data from the one or more working representations for further decryption operations.

17. The non-transitory computer-readable storage medium of claim 16, wherein the one or more storage representations are different representations of the same data, and wherein the one or more storage representations each include a respective first level of encryption that retains less than all properties of the data and a respective second level of encryption.

18. The non-transitory computer-readable storage medium of claim 16, wherein said partially decrypting data includes applying the respective decryption keys to the corresponding one or more storage representations.

\* \* \* \* \*